United States Patent
Phelan et al.

(10) Patent No.: US 10,810,044 B2
(45) Date of Patent: Oct. 20, 2020

(54) ENHANCED CACHE MEMORY ALLOCATION BASED ON VIRTUAL NODE RESOURCES

(71) Applicant: HEWLETT PACKARD ENTERPRISE DEVELOPMENT LP, Houston, TX (US)

(72) Inventors: Thomas A. Phelan, San Francisco, CA (US); Ramaswami Kishore, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 88 days.

(21) Appl. No.: 15/861,983

(22) Filed: Jan. 4, 2018

(65) Prior Publication Data
US 2019/0205174 A1 Jul. 4, 2019

(51) Int. Cl.
*G06F 9/50* (2006.01)
*G06F 12/0802* (2016.01)
*G06F 9/455* (2018.01)

(52) U.S. Cl.
CPC ........ *G06F 9/5016* (2013.01); *G06F 9/45558* (2013.01); *G06F 12/0802* (2013.01); *G06F 2009/45583* (2013.01)

(58) Field of Classification Search
CPC ............... G06F 9/5016; G06F 9/45558; G06F 12/0802; G06F 2009/45583
See application file for complete search history.

(56) References Cited

U.S. PATENT DOCUMENTS

| | | | |
|---|---|---|---|
| 6,839,895 B1* | 1/2005 | Ju ......................... | G06F 8/4442 717/144 |
| 2013/0227558 A1* | 8/2013 | Du ....................... | G06F 9/45558 718/1 |
| 2013/0262556 A1 | 10/2013 | Xu et al. | |
| 2014/0189239 A1* | 7/2014 | Hum ................... | G06F 12/0831 711/122 |
| 2014/0310474 A1* | 10/2014 | Magenheimer ....... | G06F 12/084 711/130 |

(Continued)

OTHER PUBLICATIONS

International Search Report and Written Opinion received for PCT Patent Application No. PCT/US2018/067064, dated Mar. 25, 2019, 12 pages.

(Continued)

*Primary Examiner* — Jacob D Dascomb
(74) *Attorney, Agent, or Firm* — Hewlett Packard Enterprise Patent Department

(57) ABSTRACT

Described herein are systems, methods, and software to enhance the allocation of cache resources to virtual nodes. In one implementation, a configuration system in large-scale processing environment is configured to identify a request to initiate a large-scale processing framework (LSPF) cluster, wherein the LSPF cluster comprises a plurality of virtual nodes, and identify host computing resources of a host computing system allocated to each virtual node of the LSPF cluster. The configuration system further allocates cache memory of a cache service to each of the virtual nodes based on the host computing resources, and initiate the LSPF cluster in the computing environment.

17 Claims, 9 Drawing Sheets

(56) References Cited

U.S. PATENT DOCUMENTS

| | | | |
|---|---|---|---|
| 2015/0309942 A1* | 10/2015 | Moretti | G06F 16/00 |
| | | | 711/128 |
| 2016/0048415 A1 | 2/2016 | Sarma et al. | |
| 2016/0092255 A1* | 3/2016 | Bernal | G06F 9/45558 |
| | | | 718/1 |
| 2016/0179682 A1* | 6/2016 | Moretti | G06F 12/0871 |
| | | | 711/125 |
| 2017/0097844 A1 | 4/2017 | Phelan et al. | |
| 2017/0147497 A1 | 5/2017 | Phelan et al. | |
| 2017/0171144 A1 | 6/2017 | Sagiraju et al. | |
| 2017/0322788 A1 | 11/2017 | Baxter et al. | |
| 2018/0024766 A1* | 1/2018 | Agetsuma | G06F 13/10 |
| | | | 711/154 |
| 2018/0307522 A1* | 10/2018 | Wu | H04L 41/0886 |

OTHER PUBLICATIONS

Justin Ellingwood, "Hadoop, Storm, Samza, Spark, and Rink: Big Data Frameworks Compared", available online at <https://www.digitalocean.com/community/tutorials/hadoop-storm-samza-spark-and-flink-big-data-frameworks-compared>, Oct. 28, 2016, 21 pages.
Wikipedia, "Computer cluster", available online at <https://en.wikipedia.org/w/index.php?title=Computer_cluster&oldid=818277286>, Jan. 2, 2018, 11 pages.

* cited by examiner

ENHANCED CACHE MEMORY ALLOCATION BASED ON VIRTUAL NODE RESOURCES

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes. However, although virtualization techniques provide increased efficiency within computing environments, difficulties often arise in allocating resources to the individual virtual nodes. In particular, it may be difficult for administrators to accurately determine processing, storage, and memory resources that will be used by the nodes during the course of their operation.

SUMMARY

The technology described herein enhances the allocation of cache memory to virtual nodes in a computing environment. In one implementation, a method of operating a configuration system of a large-scale processing environment includes identifying a request to initiate a large-scale processing framework (LSPF) cluster, wherein the LSPF cluster comprises a plurality of virtual nodes. The method further includes identifying host computing resources of a host computing system allocated to each virtual node of the LSFP cluster and, based on the host computing resources, allocating cache memory to each virtual node of the LSPF cluster, wherein the cache memory comprises host memory accessible to a cache service shared by virtual nodes on the host computing system. The method also provides initiating the LSPF cluster in the computing environment.

DETAILED DESCRIPTION

Figure 1:
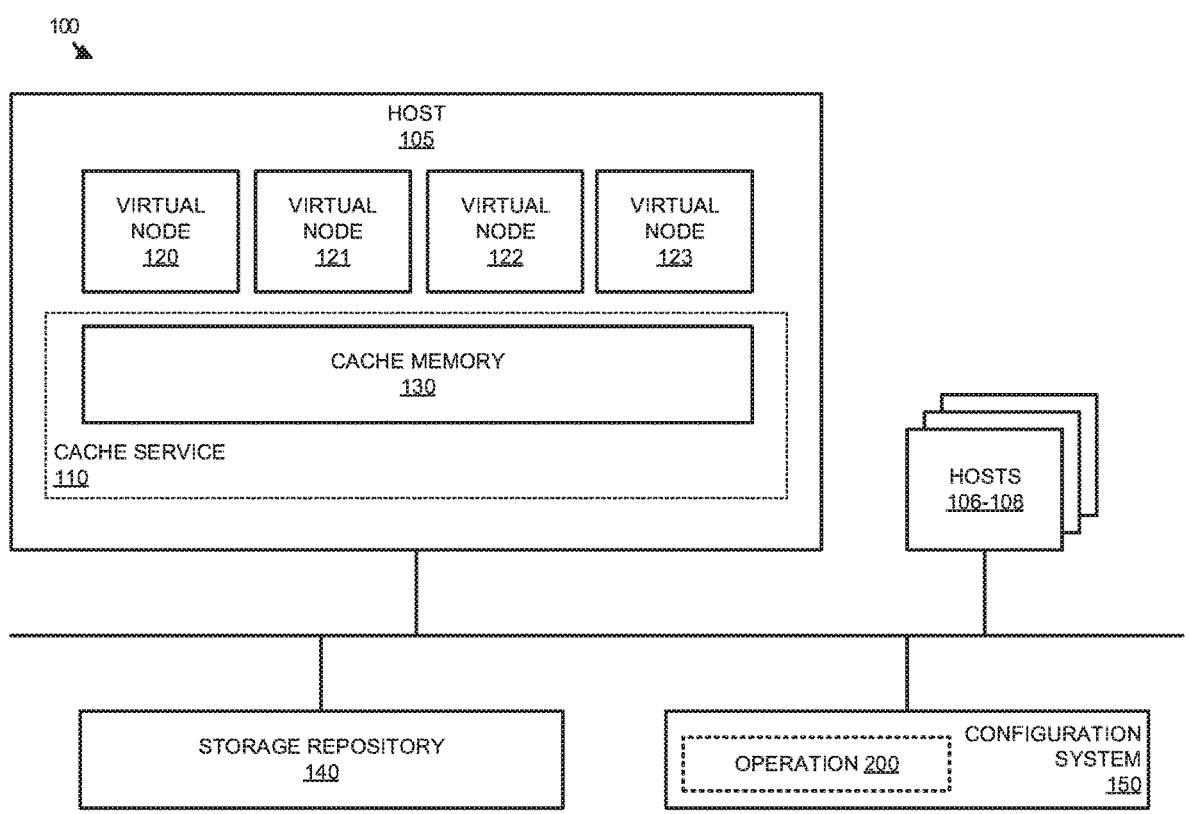
FIG. 1 illustrates a computing environment for large-scale data processing according to an implementation.

FIG. 1 illustrates a computing environment 100 for large-scale data processing according to an implementation. Computing environment 100 includes hosts 105-108, storage repository 140, and configuration system 150. Host 105 further includes virtual nodes 120-123, and cache service 110, which provides cache memory 130. Configuration system 150 is configured to provide operation 200 that is further described in FIG. 2.

In operation, hosts 105-108 provide a platform for the execution of virtual nodes that provide large-scale data processing clusters as part of computing environment 100. Each of the clusters may include one or more virtual nodes, wherein the virtual nodes may comprise full operating system virtual machines and/or containers, wherein the containers may comprise Linux containers, Docker containers, and other similar namespace based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for managing processing resources, memory resources, network resources, and other similar resources to the containerized endpoint.

To provide the required large-scale processing operations, the virtual nodes of each of the clusters may work in parallel to process data sets stored in storage repository 140. These datasets may be stored using Hadoop Distributed File System (HDFS), Gluster File System (GlusterFS), or some other similar file system. To obtain required data for processing, each of the nodes on example host 105 may communicate with cache service 110 to retrieve and cache the required portion of the dataset. For example, virtual node 120 may initiate a request for a portion of data from a HDFS dataset in storage repository 140. In response to the request, cache service 110 will identify the appropriate segment of data in the storage repository, retrieve the segment of data, and cache the data in cache memory locations accessible to virtual node 120, wherein cache memory 130 comprises host memory allocated to cache service 110. In some implementations, cache memory 130 comprises memory addresses of host 105 that are accessible to cache service 110 and virtual nodes 120-123 based on the requirements of virtual nodes 120-123.

In the present example, to assign cache memory 130 to each virtual node of virtual nodes 120-123, configuration system 150 is provided. In particular, when an administrator of the computing environment requests the generation of a cluster using configuration system 150, the administrator may define host computing resources to be allocated to each virtual node in the cluster. For example, if a cluster consisted of virtual nodes 120-123, the administrator may define a quantity of processing cores allocated to each of the nodes, a quantity of memory (separate from cache memory 130) allocated to each of the nodes, or any other similar resources of host 105 to the nodes. Once the resources are allocated by the administrator, configuration system 150 may then use information about the provided resources to configure the cache service for the virtual nodes.

Figure 2:
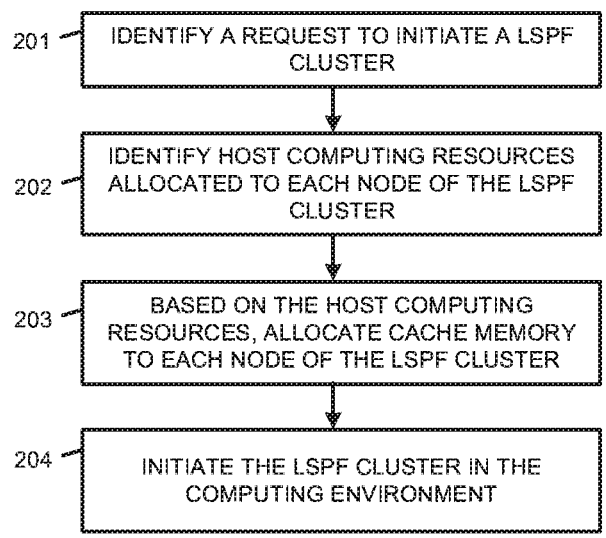
FIG. 2 illustrates an operation of a configuration system in a large-scale data processing environment according to an implementation.

FIG. 2 illustrates an operation 200 of a configuration system in a large-scale data processing environment according to an implementation. Operation 200 is referenced parenthetically in the paragraphs that follow with reference to systems and elements of computing environment 100 of FIG. 1. Although demonstrated in the examples that follow with reference to host 105, it should be understood that configuration system 150 may perform similar processes in managing clusters deployed at hosts 106-108.

As depicted, operation 200 includes identifying (201) a request to initiate a large-scale processing framework (LSPF) cluster, wherein the cluster comprises a plurality of virtual nodes, and further includes identifying (202) host computing resources allocated to each virtual node in the LSPF cluster. In some implementations, when an administrator requests a new cluster, configuration system 150 may provide a user interface to an administrator of the environment, permitting the user to select and generate new clusters using hosts 105-108. In permitting the administrator to generate a cluster, configuration system 150 may provide the administrator with the ability to select the number of nodes for a cluster, the type of framework for the cluster (e.g. Apache Hadoop®, Apache Spark®, and the like), the amount of operational memory dedicated to each of the nodes, the number of processing cores from a central processing unit of the host to be allocated to each of the nodes, or some other similar information about the cluster. As an example, an administrator may, via a user interface provided by configuration system 150, select an Apache Hadoop cluster with four nodes, each assigned two processing cores and four gigabytes of memory.

Once the administrator provides the host computing resource information for the cluster, operation 200 allocates (203) cache memory to each node of the LSPF cluster based on the host computing resources, wherein the cache memory is distinct and separate from the operational memory of the individual virtual node. Referring to host 105 in computing environment 100, cache memory 130 comprises physical host memory that is used to cache data for processing by virtual nodes executing on host 105. In particular, cache memory may comprise random access memory (RAM), dynamic random access memory (DRAM), or some other similar type of memory accessible by cache service 110 and virtual nodes 120-123. In the present implementation, in making cache memory available to the virtual nodes, each of the virtual nodes may be allocated memory addresses in cache memory 130, wherein the addresses are accessible by the virtual node and the cache service. To determine the amount of cache memory that is allocated to each of the virtual nodes, configuration system 150 may process the individual host resources that are allocated to the virtual nodes. For example, virtual node 120 may be allocated a first number of processing cores and first amount of dedicated memory, while virtual node 122 may be allocated a second number of processing cores and second amount of dedicated memory. As a result, when configuring the cache memory for the virtual nodes, each of the virtual nodes may be provided with a different amount of cache memory 130.

After determining the cache memory to be allocated to each of the nodes of the processing cluster, operation 200 further initiates (204) the LSPF cluster in the computing environment with the allocated cache memory. Referring to an example in computing environment 100 of FIG. 1, if virtual nodes 121-123 are to be deployed as part of a new LSPF cluster, configuration system 150 may inspect the resources that are dedicated to each of the virtual nodes, and identify a portion of cache memory 130 to be allocated to each of the virtual nodes. Once the portion of cache memory is identified for each of the virtual nodes, configuration system 150 may initiate the virtual nodes, wherein the virtual nodes may use cache service 110 and the corresponding portions of cache memory 130 to process data from storage repository 140.

Figure 3A:
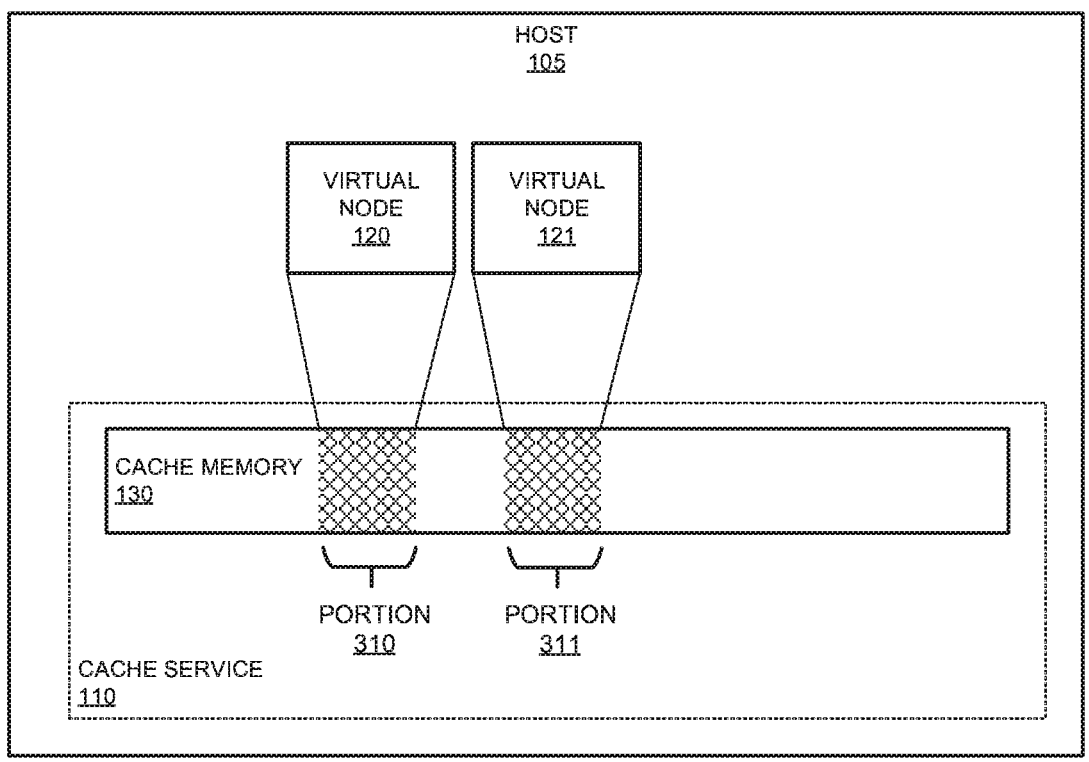
FIGS. 3A-3B illustrate a deployment of a virtual cluster according to an implementation.
Figure 3B:
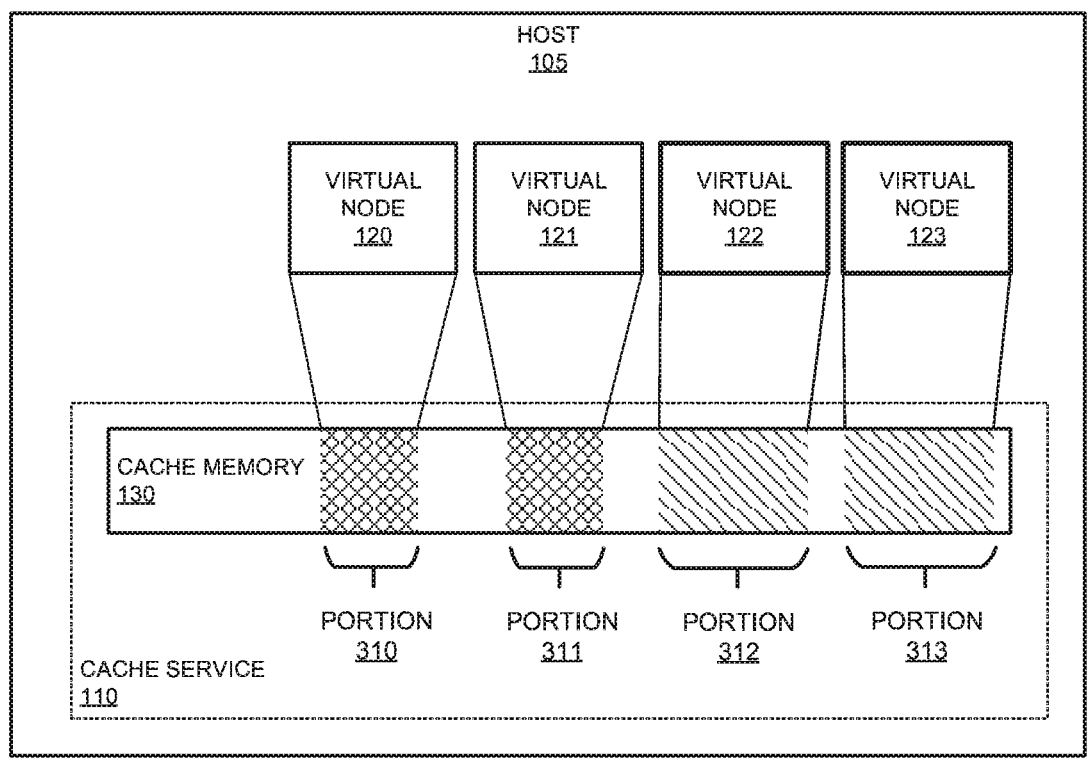

FIGS. 3A-3B illustrate a deployment of a virtual cluster according to an implementation. FIGS. 3A-3B are demonstrated herein using host 105 from computing environment 100 of FIG. 1. The deployment of the cluster in FIGS. 3A and 3B demonstrate the initiation of virtual nodes 122-123 as part of the cluster, but it should be understood that any number of virtual nodes may be initiated on host 105 as part of a cluster.

Referring first to FIG. 3A, virtual nodes 120-121 execute on host 105 to provide large-scale data processing operations as part of a cluster. In providing the operations, each virtual node of virtual nodes 120-121 is allocated corresponding portions 310-311 of cache memory 130. Cache memory 130 comprises memory addressable by cache service 110 and virtual nodes executing on host 105. In particular, cache service 110 is configured to act as a data interaction intermediary between the virtual nodes executing on the host and storage repositories that store data for processing by the virtual nodes. To provide this operation, cache service 110 is configured to identify data requests from the virtual nodes, obtain the data associated with the request from a storage repository, and cache the data in a corresponding portion of portions 310-311 corresponding to the requested virtual machine. In some implementations, the request from virtual node may comprise a request in a first data access format (e.g. a format associated with HDFS, GlusterFS, or some other similar format). Once the request is identified in cache service 110, the cache service may translate the first data access format to a second data access format associated with the requested data storage repository. For example, virtual node 120 may be configured to request data using HDFS, however, the data repository for the data may store the data using GluserFS or some other data storage structure. Consequently, as requests are identified using the HDFS format, cache service 110 may be used to translate the request into the appropriate data access format to retrieve the required data. Once retrieved, cache service 110 may cache the data in portion 310 associated with virtual node 120, wherein virtual node 120 may process the data as required for the processing job.

In allocating the portions of cache memory 130 to each of the virtual nodes, a configuration system may be used to identify the quantity of cache memory that should be made available to the virtual nodes. To identify the quantity of cache memory, the configuration system may process information about the host resources that are allocated to each of the virtual nodes. These host resources may include processing cores of a CPU of host 105, memory that is dedicated to the virtual node, or some other similar resource allocated to the virtual node. In some implementations, these resources may be provided by an administrator of the environment, wherein the user may be provided with a user interface to define the dedicated resources of the virtual node. Once the resources are provided, the configuration system may identify the portion size of cache memory 130 that should be allocated to the virtual nodes of the cluster.

Turning to FIG. 3B, FIG. 3B demonstrates the addition of virtual nodes as a cluster to host 105. In deploying the new virtual cluster, a configuration system, such as configuration system 150 in FIG. 1, is configured to identify a request to generate a new cluster and identify host computing resources of host 105 allocated to each virtual node of the LSPF cluster. Here, the new cluster for host 105 comprises two virtual nodes 122-123, wherein the virtual nodes may be allocated processing resources (e.g. cores, clock cycles, and the like), as well as dedicated memory resources of host 105, such as DRAM. In addition to allocating host resources to the individual virtual nodes, the configuration system also determines an amount of cache memory 130 that should be provided to the virtual nodes based on the host resources. In some implementations, the dedicated resources of the virtual node (e.g. processing resources and memory) may be defined by the administrator generating the new cluster, and the cache memory may be dynamically allocated based on the information provided from the administrator.

In some implementations, cache service 110 may be allocated a defined set of memory addresses that are used to cache data for virtual nodes as they are initiated on host 105. In particular, when a new cluster is requested by an administrator, configuration system 150 may identify free portions of cache memory 130 and allocate the portions to the new cluster. As demonstrated in the present example, virtual nodes 122-123 are allocated larger portions of cache memory 130 to support the large-scale data processing operations of the nodes. These larger portions may be determined based on a greater number of cores provided to the virtual nodes, a larger amount of dedicated memory provided to each of the virtual nodes, or some other similar host resource allocated to the virtual nodes.

Although demonstrated in the previous example as adding a cluster to a host computing system, it should be understood clusters may also be removed from a host system. In removing a cluster, an administrator of the computing environment may identify that the operations of the cluster are no longer required, and may generate a request to remove the nodes associated with the cluster. In response to the request, the configuration system may stop the execution of the virtual nodes, and make the cache memory available to future virtual nodes. Accordingly, if a new cluster is requested, cache memory portions that were allocated to the removed cluster may be allocated to the new cluster.

Figure 4:
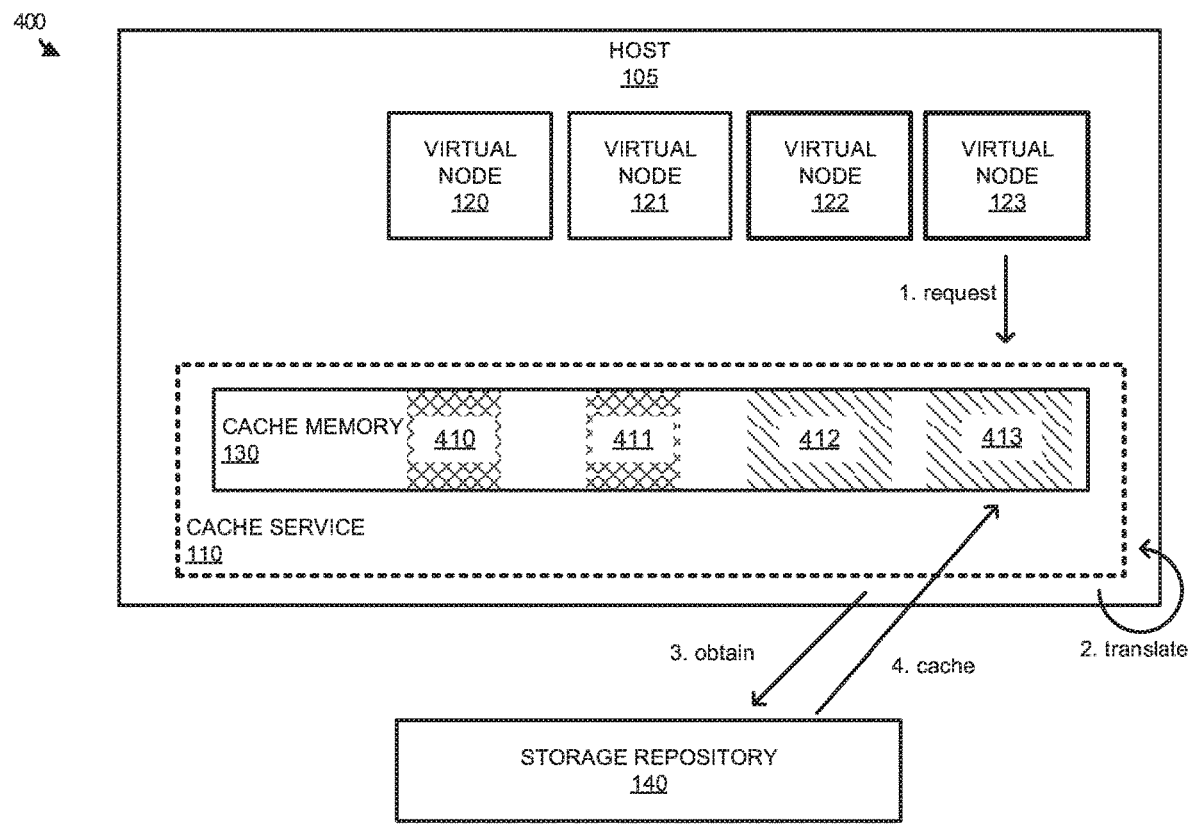
FIG. 4 illustrates an overview of a data interaction for a virtual node according to an implementation.

FIG. 4 illustrates an overview 400 of a data interaction for a virtual node according to an implementation. Overview 400 includes storage repository 140 and host 105 from computing environment 100 of FIG. 1. Host 105 includes cache service 110, cache memory 130, and virtual nodes 120-123. Cache memory 130 includes portions 410-413, wherein each of the portions corresponds to a virtual node in virtual nodes 120-123.

As described herein, when virtual nodes are initiated on a host computing system, the nodes are each allocated a portion of cache memory supported by a cache service. This cache memory is used in caching data for processing by the individual virtual nodes. In the present example, at step 1, virtual node 123 generates a request for data from storage repository 140, wherein the request is in accordance with a first data access format. As the request is generated, cache service 110 may identify the request, and translate the request from the first data access format to a second data access format, at step 2. As an example, a request may be generated from an Apache Hadoop® virtual node using HDFS, however, the data may be stored in storage repository 140 using GlusterFS. As a result of the configuration cache service 110 may be required to translate the request to a format used by GlusterFS prior to obtaining the data.

Once the request is translated, cache service 110, at step 3, obtains the data from storage repository 140, and caches the data in portion 413 of cache memory 130 allocated to virtual node 123. For example, virtual node 123 may request at least a portion of a data object stored in storage repository 140. In response to the request, cache service 110 will translate the request into a data access format associated with the object, and retrieve the object using the translated data access format. As the data is retrieved, cache service 110 will cache the data in memory portion 413 associated with virtual node 123, wherein virtual node 123 may access the data for processing. In some implementations, cache service 110 may access the same memory addresses as the virtual nodes. As a result, when a request is generated, rather than caching the data in a first location associated with the cache service and subsequently performing a memory transfer to move the data into a memory location associated with the virtual node, cache memory 130 is configured such that it is addressable by both the cache service and the virtual node. This sharing of the memory space limits the amount of time that is required in caching the data for the virtual node.

Figure 5A:
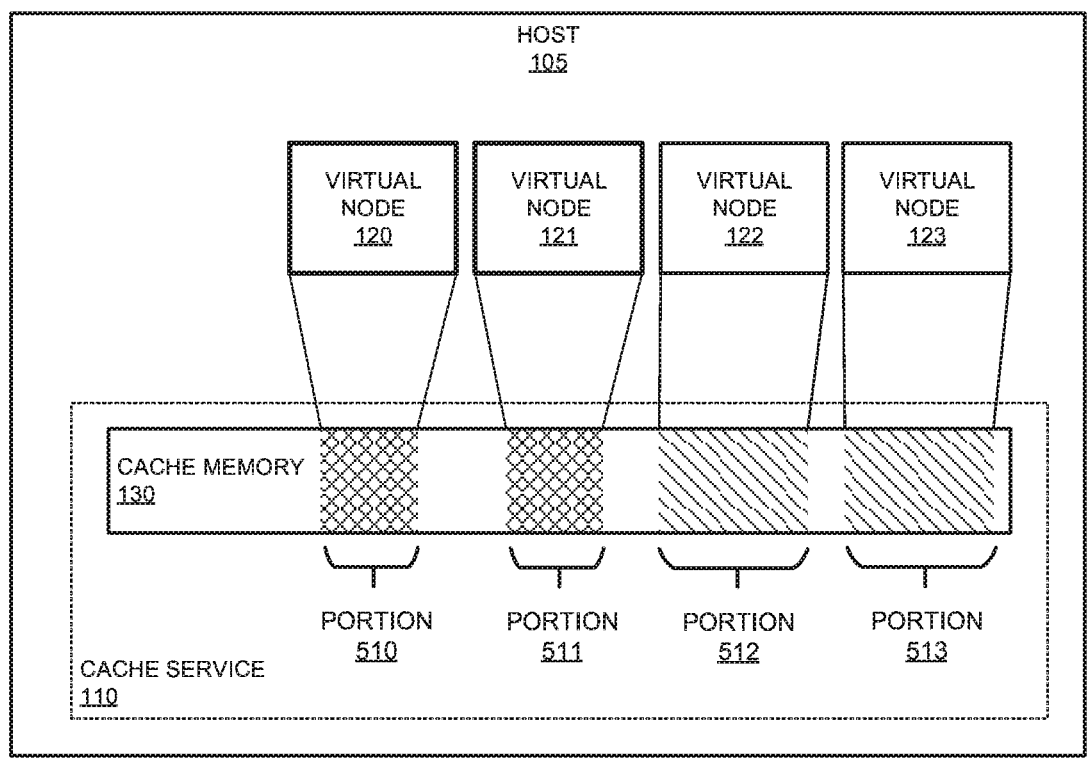
FIGS. 5A-5B illustrate an operational scenario of dynamically allocating cache memory according to an implementation.
Figure 5B:
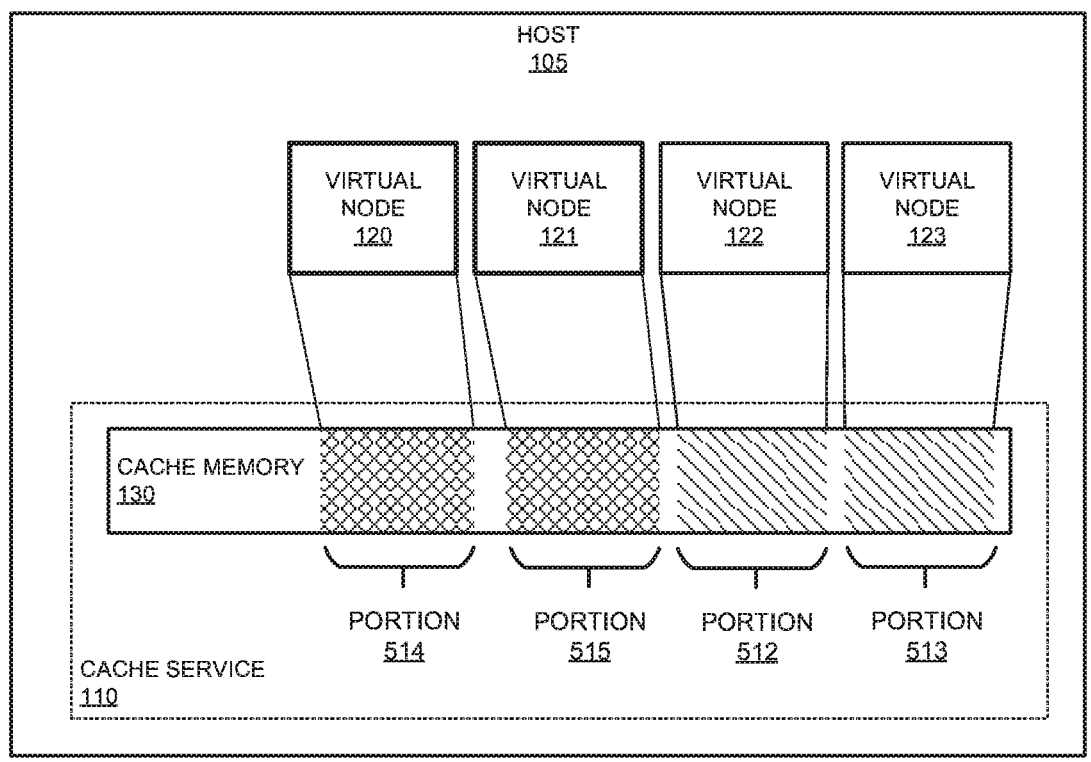

FIGS. 5A-5B illustrate an operational scenario of dynamically allocating cache memory according to an implementation. FIGS. 5A and 5B include elements of host 105 introduced in FIG. 1. In particular, FIGS. 5A-5B include cache service 110, cache memory 130, and virtual nodes 120-123. FIG. 5A includes portions 510-513 of cache memory 130 that are allocated to corresponding virtual nodes 120-123. FIG. 5B includes portions 512-515 of cache memory 130 that are allocated to corresponding virtual nodes 120-123.

Referring first to FIG. 5A, virtual nodes are executed on host computing systems, such as host 105, to provide a platform for large-scale data processing operations. In particular, one or more virtual nodes may be deployed as a cluster to support Hadoop, Spark, and other similar large-scale data processing operations. To support the operations of the virtual nodes, each of the virtual nodes are supported by a shared cache service 110 that is used to retrieve and cache data for the corresponding virtual node. In caching the data, each of the virtual nodes is allocated a portion of cache memory 130, wherein cache memory 130 comprises an address space that cache service 110 can use to cache data for the individual node. To ensure that each of the nodes is allocated an adequate amount of cache memory, a configuration service may be provided that identifies and allocates the portions of cache memory to each of the individual nodes.

In the present example, virtual nodes 120-123 are allocated corresponding memory portions 510-513. During the execution of the virtual nodes, cache service 110 or some other monitoring service executing on host 105 monitors operational statistics for each of the virtual nodes. These operational statistics may include the amount of processing resources that are used by each of the nodes (e.g. central processing unit or CPU load generated by each of the nodes), the dedicated memory usage by each of the virtual nodes, the cache memory usage of each of the virtual nodes, or some other similar operational statistic. In some implementations, the cache service may act as part of the configuration system and may dynamically modify the cache memory resources allocated to each of the virtual nodes. In other implementations, the cache service or other monitoring service may report information to the configuration system, permitting the configuration system to update the cache memory allocated to each of the virtual nodes.

Turning to FIG. 5B, after the operational statistics are identified for the virtual nodes executing on host 105, the operational statistics are used to modify the allocation of cache memory to one or more of the virtual nodes. In the present example, the cache memory allocated to virtual nodes 120-121 is modified from a first sized portion associated with portions 510-511 to a second sized portion associated with portions 514-515. In the present example, the portion size is demonstrated as increasing based on the operational statistics of the virtual nodes, it should be understood that the cache portion size may also decrease based on the operational statistics of the virtual nodes.

As an illustrative example of allocating the cache memory, cache service 110 may monitor the operational statistics for virtual nodes 120-123, and identify that virtual nodes 120-121 (which may represent a different cluster from virtual nodes 122-123) are using a larger amount of computing resources and/or may be bottlenecked by the current amount of cache memory. These resources may include a CPU load induced by the virtual nodes, memory resources used by the virtual nodes, cache memory resources used by the virtual nodes, or some other similar resources by the virtual nodes. Based on the larger amount of resources being used by the virtual nodes, each of virtual nodes 120-121 may be allocated cache memory portions 514-515, respectively, wherein the new portions of memory may permit the virtual nodes to cache additional data for processing.

In some implementations, in allocating the initial portion sizes of cache memory to virtual nodes 120-123, a configuration system may be used that identifies host resources allocated to the virtual nodes and allocates cache memory portions based on the host resources. These host resources may include processing cores allocated to the virtual node from an administrator, dedicated memory resources allocated to the virtual node, or some other similar host resource configurable by the administrator. Additionally, in some examples, the configuration system may consider other information about the cluster including the type of cluster (e.g. Hadoop, Spark, and the like), as well as the version of the cluster in determining the amount of cache memory to allocate to a particular node. Once the initial cache memory allocation is determined, the virtual nodes may be initiated on the corresponding host. The host may then monitor the operational statistics of the virtual nodes, and update the cache memory allocations as described herein.

Figure 6:
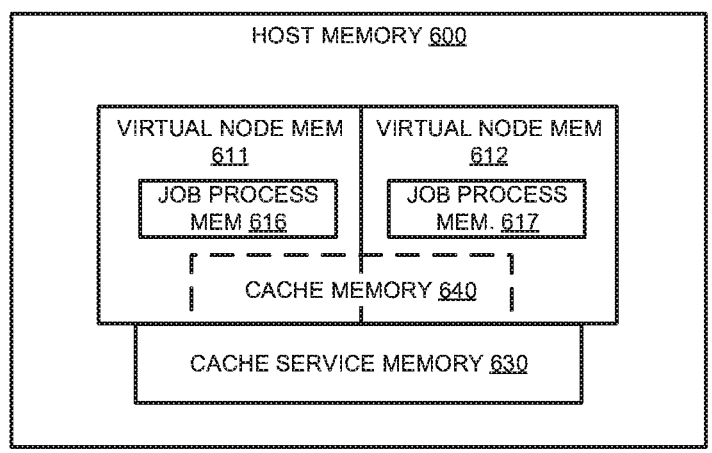
FIG. 6 illustrates host memory according to an implementation.

FIG. 6 illustrates host memory 600 according to an implementation. Host memory 600 includes allocated memory for virtual node memory 611 and 612 with job process memory 616 and 617. Host memory 600 further includes allocated memory for cache service memory 630 and cache memory 640.

As described herein, as virtual nodes are deployed within a LSPF environment, the nodes are allocated processing and memory resources for providing the desired operations. In particular, the nodes may be provided with processing cores, clock cycles, and the like for the processing system, and are also provided with dedicated memory wherein the operations, such as job processes associated with job process memory 616 and 617 may execute from. In addition to the dedicated host resources (processing and memory) associated with the virtual nodes, each of the virtual nodes is further allocated a portion of cache memory 640, wherein cache memory 640 is shared between the virtual node and a cache service provided via cache service memory 630.

In allocating cache memory 640 to each of the virtual nodes, a configuration service may be provided in a computing environment (not shown), wherein the configuration service may allocate an amount of cache memory to each of the operating virtual nodes based on the dedicated host resources for the virtual node. As an example, virtual nodes allocated with more host resources, such as processing cores or dedicated memory, may be provided with a larger amount of cache memory, whereas virtual nodes allocated with less host resources may be provided with a less amount of cache memory. In some implementations, when the cache service is initiating on a host computing system, the cache service is allocated a predefined quantity of memory that can then be assigned to virtual nodes on the host computing system. As a result, to ensure that each of the virtual nodes is provided with an optimal amount of cache memory, the configuration system may be used to identify and allocate memory based on the resources.

Once the host resources are allocated for the virtual nodes along with portions of cache memory 640, each of the virtual nodes may use the cache service to retrieve and cache data for processing by the virtual nodes. For example, a virtual node associated with virtual node memory 611 may request data from a data storage repository. In response to the request, the cache service may translate the request from a first access format to a second access format, and obtain the data from the repository. Once obtained, the cache service may cache the data in cache memory 640 associated with the virtual node. After the data is cached within the cache memory the virtual node may process the data as required.

Although demonstrated in the previous example as retrieving data from the storage repository, it should be understood that similar operations may be employed in storing data to the storage repository. In particular, when a job process executing on a virtual node requires saving data to the storage repository, the cache service may identify the requirement (as a storage request), translate the request from a first access format to a second access format, and store the data in the repository in accordance with the second access format.

In some implementations, in retrieving the data from the storage repository the cache service associated with cache service memory 630 may limit the number of times that the data needs to be replicated in caching the data for the virtual nodes. In particular, because the virtual nodes may share an addressable memory space with the cache service, the cache service may cache the data in the shared memory space, limiting the requirement the data must first be copied to the host memory space and transferred into the guest memory space associated with the virtual node.

In some implementations, cache memory 640 that is allocated to each of the virtual machines may be dynamic based on the operations of the job processes in the virtual machines. In particular, the cache service or some other process executing on the host may monitor the amount of cache memory 640 that is used by the virtual nodes in providing data to the job processes. For example, a virtual node may be initially provided with two gigabytes of cache memory 640 to provide the required operations. However, during the execution of job processes on the virtual node, the cache service may identify that only one gigabyte of cache is used. As a result, the cache service may communicate with the configuration system, or operate as part of the configuration system, to reduce the amount of cache memory 640 that is made available to the virtual node. Similar operations may also be provided to increase the amount of cache memory that is allocated to the virtual node.

Figure 7:
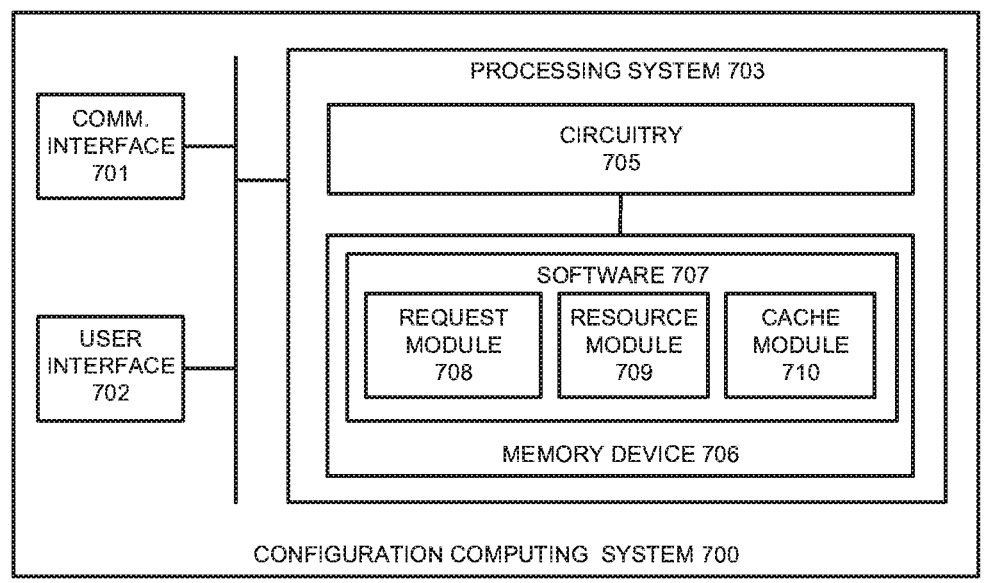
FIG. 7 illustrates a configuration computing system to initiate virtual clusters according to an implementation.

FIG. 7 illustrates a configuration computing system 700 to initiate virtual clusters according to an implementation. Computing system 700 is representative of any computing system or systems with which the various operational architectures, processes, scenarios, and sequences disclosed herein for a configuration system may be implemented. Computing system 700 is an example of configuration system 150, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with one or more hosts in a large-scale data processing environment, wherein the hosts execute virtual nodes to support LSPF jobs.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes request module 708, resource module 709, and cache module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, request module 708 directs processing system 703 to identify a request from an administrator to generate a new large-scale processing cluster, wherein the cluster comprises one or more virtual nodes. In response to the request, resource module 709 directs processing system 703 to identify dedicated host computing resources for each virtual node in the cluster, wherein the resources may include processing cores, clock cycles, dedicated memory for the job processes, or some other similar host resource dedicated to the virtual node. In some examples, in response to an administrator request for a cluster, the administrator may be provided with options for the new cluster, wherein the user may select the type of LSPF, the number of nodes for the cluster, and the host computing resources (processing cores, dedicated memory, and the like). Based on the information provided by the administrator, virtual nodes may be initiated on at least one host computing system in the environment to support the request.

In the present implementation, in addition to provisioning virtual nodes to support the administrator's request, cache module 710 is provided that, when read and executed by processing system 703, identifies cache memory to be allocated to the virtual nodes. This cache memory, which is used in caching data during the operation of the virtual nodes, is allocated by cache module 710 based on the computing resources provided to the node. In particular, based on the computing resources provided during the configuration by the administrator, cache module 710 may allocate cache memory that is suitable for the operation of the node. This cache memory is associated with a cache service that executes on the same host, wherein the cache service identifies a data request for a virtual node, retrieves the data associated with the request from a storage repository, and caches the data in cache memory allocated to the virtual node. In some implementations, the cache service may be configured to provide a translation operation for the virtual node, wherein the virtual node may request data using a first data access format, and the cache service may translate the request into a second data access format to obtain the data from a storage repository.

In some examples, when a host computing system is initiated, a cache service is initiated and allocated a portion of memory to provide the caching operations described herein for virtual nodes. As virtual nodes are deployed on the host system, portions of the cache memory may be allocated to individual nodes to provide the caching operations. Additionally, once a cluster is selected to be removed, the cache memory may be made available again to allocate to a new virtual node.

Although described in the previous example as allocating cache memory during the deployment of a virtual cluster, it should be understood that the amount of cache memory may dynamically be adjusted based on operational statistics of the virtual nodes. In some implementations, the cache service or some other monitoring service, may monitor the resources that are used by each of the nodes. This may include the amount of processing resources used, the amount of dedicated memory used, the amount of cache memory used, or some other similar operational statistics related to the data processing by the virtual node. Based on the operational statistics, the cache memory that is allocated to the virtual node may be adjusted. For example, if a virtual node were using half of the cache memory that was allocated to it for the cache service, then the configuration system (which may operate in conjunction with the monitoring service) may reduce the amount of cache memory that is allocated to the virtual node. In contrast, if a virtual node were saturating the cache memory allocated to it, then the configuration system may increase the amount of cache memory allocated to the virtual node. In this manner, to ensure that the finite cache memory is efficiently allocated to each of the virtual nodes, configuration computing system 700 may be used to dynamically determine the quantity of cache memory allocated to each of the nodes.

Returning to the elements of FIG. 1, hosts 105-108 and configuration system 150 may each comprise communication interfaces, network interfaces, processing systems, computer systems, microprocessors, storage systems, storage media, or some other processing devices or software systems, and can be distributed among multiple devices. Examples of hosts 105-108 and configuration system 150 can include software such as an operating system, logs, databases, utilities, drivers, networking software, and other software stored on a computer-readable medium. Hosts 105-108 and configuration system 150 may comprise, in some examples, one or more server computing systems, desktop computing systems, laptop computing systems, or any other computing system, including combinations thereof.

Storage repository 140 may reside on any computing system or systems that can include communication interfaces, network interfaces, processing systems, computer systems, microprocessors, storage systems, storage media, or some other processing devices or software systems, and can be distributed among multiple devices. Storage repository 140 may be located on one or more server computing systems, desktop computing systems, laptop computing systems, or any other computing system, including combinations thereof. Although illustrated separate from hosts 105-108, it should be understood that storage repository 140 may be stored locally on hosts 105-108. Storage repository 140 may store data using HDFS, GlusterFS, or some other similar distributed file or object storage, including combinations thereof Communication between hosts 105-108, storage repository 140, and configuration system 150 may use metal, glass, optical, air, space, or some other material as the transport media. Communication between hosts 105-108, storage repository 140, and configuration system 150 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 105-108, storage repository 140, and configuration system 150 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a configuration system of a large-scale processing environment, the method comprising:
presenting, by the configuration system, a user interface to an administrator of the large scale processing environment through which characteristics of a large-scale processing framework (LSPF) cluster are specified by the administrator;
receiving, by the configuration system, a request from the administrator via the user interface to initiate the LSPF cluster, wherein the LSPF cluster comprises a plurality of virtual nodes each representing a full operating system virtual machine or a container that is to be run on a host computing system and wherein the request specifies an LSPF type for the LSPF cluster and a quantity of each of a plurality of types of host computing resources of the host computing system to be allocated to each virtual node of the LSPF cluster, wherein the plurality of types of host computing resources include one or more of processing resources and memory resources;
allocating a quantity of cache memory to each virtual node of the LSPF cluster based on the LSPF type and the quantity of each of the plurality of types of host computing resources to be allocated to each virtual node of the plurality of virtual nodes, wherein the cache memory comprises host memory of the host computing system that is accessible to a cache service running on the host computing system, shared by the plurality of virtual nodes, and through which the plurality of virtual nodes requests portions of data from a dataset in a storage repository and, wherein the plurality of virtual nodes are to work in parallel to process the portions of data; and
initiating the LSPF cluster in the large-scale processing environment, including configuring the plurality of virtual nodes in accordance with the request and configuring the cache memory in accordance with said allocating.

2. The method of claim 1, wherein the host computing resources comprise processing cores.

3. The method of claim 1, wherein the host computing resources comprise memory for executing the LSPF cluster on the plurality of virtual nodes.

4. The method of claim 1 further comprising:
monitoring operational statistics for the LSPF cluster during execution of the LSPF cluster; and
modifying the quantity of cache memory allocated to each virtual node in the LSPF cluster based on the operational statistics.

5. The method of claim 4, wherein the operational statistics comprise processing system usage and memory usage by each virtual node of the LSPF cluster.

6. The method of claim 4, wherein the operational statistics comprise cache memory usage by each virtual node of the LSPF cluster.

7. The method of claim 1, further comprising facilitating efficient caching of the data by the cache service on behalf of the plurality of nodes as a result of the plurality of nodes sharing an addressable memory space of the cache memory with the cache service.

8. A computing system comprising:
one or more non-transitory computer readable storage media;
a processing system operatively coupled to the one or more non-transitory computer readable storage media; and
program instructions stored on the one or more non-transitory computer readable storage media to configure a large-scale processing environment that, when read and executed by the processing system, direct the processing system to at least:
present a user interface to an administrator of the large scale processing environment through which characteristics of a large-scale processing framework (LSPF) cluster are specified by the administrator;
receive a request from the administrator via the user interface to initiate a LSPF cluster, wherein the LSPF cluster comprises a plurality of virtual nodes each representing a full operating system virtual machine or a container that is to be run on a host computing system and wherein the request specifies an LSPF type for the LSPF cluster and a quantity of a plurality of types of host computing resources of the host computing system to be allocated to each virtual node of the LSPF cluster, wherein the host computing resources include one or more of processing resources and memory resources;
allocate a quantity of cache memory to each virtual node of the LSPF cluster based on the LSPF type and the quantity of each of the plurality of types of host computing resources to be allocated to each virtual node, wherein the cache memory comprises host memory of the host computing system that is accessible to a cache service running on the host computing system, shared by the plurality of virtual nodes, and through which the plurality of virtual nodes requests portions of data from a dataset in a storage repository and, wherein the plurality of virtual nodes are to work in parallel to process the portions of data; and
initiate the LSPF cluster in the large-scale processing environment, including configuring the plurality of virtual nodes in accordance with the request and configuring the cache memory in accordance with said allocating.

9. The computing system of claim 8, wherein the host computing resources comprise processing cores.

10. The computing system of claim 8, wherein the host computing resources comprise memory for executing the LSPF cluster on the plurality of virtual nodes.

11. The computing system of claim 8, wherein the program instructions further direct the processing system to:
monitor operational statistics for the LSPF cluster during execution of the LSPF cluster; and
modify the quantity of cache memory allocated to each virtual node in the LSPF cluster based on the operational statistics.

12. The computing system of claim 11, wherein the operational statistics comprise processing system usage and memory usage by each virtual node of the LSPF cluster.

13. The computing system of claim 11, wherein the operational statistics comprise cache memory usage by each virtual node of the LSPF cluster.

14. The computing system of claim 8, wherein efficient caching of the data by the cache service on behalf of the plurality of nodes is facilitated as a result of the plurality of nodes sharing an addressable memory space of the cache memory with the cache service.

15. A non-transitory machine readable medium storing instructions executable by a large-scale processing environment, including a host computing system and a configuration system, the non-transitory machine readable medium comprising:
instructions to present a user interface to an administrator of the large scale processing environment through which characteristics of a large-scale processing framework (LSPF) cluster are specified by the administrator;
instructions to receive a request from the administrator via the user interface to initiate a LSPF cluster, wherein the LSPF cluster comprises a plurality of virtual nodes each representing a full operating system virtual machine or a container that is to be run on a host computing system and wherein the request specifies an LSPF type for the LSPF cluster and a quantity of each of a plurality of types of host computing resources of the host computing system to be allocated to each virtual node of the LSPF cluster, wherein the plurality of types of host computing resources include one or more of processing resources and memory resources;
instructions to allocate a quantity of cache memory to each virtual node of the LSPF cluster based on the LSPF type and the quantity of the plurality of types of host computing resources to be allocated to each virtual node of the plurality of virtual nodes, wherein the cache memory comprises host memory of the host computing system that is accessible to a cache service running on the host computing system, shared by the plurality of virtual nodes, and through which the plurality of virtual nodes retrieve portions of data from a dataset in a storage repository; and
instructions to initiate the LSPF cluster in the large-scale processing environment, including configuring the plurality of virtual nodes in accordance with the request and configuring the cache memory in accordance with said allocating.

16. The non-transitory machine readable medium of claim 15, wherein the host computing resources comprise processing cores and memory for executing the LSPF cluster on the plurality of virtual nodes.

17. The non-transitory machine readable medium of claim 15, wherein efficient caching of the data by the cache service on behalf of the plurality of nodes is facilitated as a result of the plurality of nodes sharing an addressable memory space of the cache memory with the cache service.

* * * * *